United States Patent [19]

Habeck et al.

[11] Patent Number: 4,743,969
[45] Date of Patent: May 10, 1988

[54] CORRELATOR

[75] Inventors: Alwin F. G. Habeck; Walter H. Demmer, both of Hamburg; Jürgen Ruprecht, Oststeinbek; Detlef W. K. Oldach, Hamburg, all of Fed. Rep. of Germany

[73] Assignee: U.S. Philips Corporation, New York, N.Y.

[21] Appl. No.: 832,290

[22] Filed: Feb. 21, 1986

[30] Foreign Application Priority Data

Feb. 23, 1985 [DE] Fed. Rep. of Germany ....... 3506449

[51] Int. Cl.$^4$ .......................... H04N 5/08; H04N 5/10
[52] U.S. Cl. .................................... 358/153; 358/148; 328/139; 328/110
[58] Field of Search ........................ 358/148, 153–157, 358/329; 328/110, 117, 139

[56] References Cited

U.S. PATENT DOCUMENTS 4,143,396  3/1979  MacKenzie ........................ 358/329

OTHER PUBLICATIONS

Taschenbuch Elektrotechnik; "Band 2 Grundlagen der Informationstechnik"; by Eugen Philippow; 1977; p. 171.

Primary Examiner—James J. Groody
Assistant Examiner—Michael D. Parker
Attorney, Agent, or Firm—Thomas A. Briody; William J. Streeter; Gregory P. Gadson

[57] ABSTRACT

An input signal comprising pulses in periodical intervals and being present as a series of digital sampling values is applied to a correlator for generating a correlator output signal which assumes an extreme value in the case of a pulse. The correlator comprises a chain of at least two cascaded delay members, the first of which receives the input signal. A pulse and pulse-free interval, respectively is associated with each delay member of the series, the delay members succeeding each other in the same manner as the pulses or pulse-free intervals occur. All but at most one delay member at the beginning or end of the chain can store just all sampling values of the associated pulse or pulse-free interval. The input signal of the first delay member and the output signals of all delay members are applied to a combination circuit which linearly combines and integrates the signals and forms the output signal of the correlator.

20 Claims, 2 Drawing Sheets (a.)

(b.)

CORRELATOR

BACKGROUND OF THE INVENTION

The invention relates to a correlator comprising a chain of at least two cascaded delay members, the first of which receives an input signal comprising pulses in periodical intervals and being present as a series of digital sampling values, and a combination circuit for linearly combining the input signal of the first delay member and the output signals of all delay members and for generating by the occurrence of a pulse a correlator output signal assuming an extreme value.

A correlator of this type may be used, for example, in a television receiver for detecting the synchronisation pulses in a noisy television signal.

The correlation function between an input signal and an available specimen signal is formed by means of a correlator. The correlation function gives an indication about the similarity of two signals. For example, a periodical pulse-shaped signal whose variation is qualitatively known, but which is beset with noise and is therefore unrecognisable can be detected by means of a correlator. The output signal of the correlator, the correlation function, assumes an extreme value in the case of a pulse so that the instant of occurrence of the pulses can be determined.

A correlator consisting of a chain of cascaded delay members the first of which receives the pulse-shaped input signal and which members each store one sampling value is known for example from the book by Eugen Philippow, "Taschenbuch Elektrotechnik", Vol. 2, 1st edition 1977, page 171. The input signal and the output signals of the delay members are applied to a combination circuit (adder stage) via phase-shifting circuits possibly inverting the separate signals. The multiplication of the pulse-shaped specimen signal by the input signal which is required for forming the correlation function is realised by the phase-shifting circuits. In the combination circuit the correlation function multiplied by a constant is formed by linear combination (addition).

SUMMARY OF THE INVENTION

It is an object of the invention to simplify a correlator of the type described in the opening paragraph and thereby reduce the complexity and the cost of the circuit.

To this end the correlator according to the invention is characterized in that a pulse and a pulse-free interval respectively are associated with each delay member, in that the delay members succeed each other in the same manner as the pulses and pulse-free intervals occur, in that all but at most one delay member at the beginning or end of the series are suitable for storing just all sampling values of the associated pulse or pulse-free interval, and in that the combination circuit additionally comprises an integrator for integrating the linearly combined signal.

In the correlator according to the invention a delay member associated with a pulse-free interval succeeds a delay member associated with a pulse. The chain may thus comprise as many delay members as there are pulses or pulse-free intervals during an overall delay period. The overall delay period should advantageously be equal to one signal period. Either the first delay member of the chain or the last may be formed in such a manner that the delay period is distinguished from the duration of a pulse or a pulse-free interval. All other delay members are delayed by the number of clock pulses corresponding to the number of the sampling values of each pulse or pulse-free interval. Furthermore it is not necessary for the number of delay members to be equal to the number of pulses or pulse-free intervals when there are more than two pulses or pulse-free intervals. For example, it is not necessary for a delay member to take the last pulse-free interval of a period into account or, for example, a shorter pulse may not be taken into account, that is to say, the interval of this pulse is interpreted as part of a pulse-free interval consisting of the interval of the short pulse and the pulse-free intervals before and after the short pulse.

In the combination circuit the linear combination and integration is performed in such a manner that each input signal is subtracted from the output signals of the delay members, that every second difference is inverted and that this inverted difference and the non-inverted difference are added and integrated. The input signal is multiplied by the specimen signal by means of inversion or non-inversion of the differences. The extreme value of the correlator output signal indicates when a pulse has been present.

In a first embodiment of the invention the combination circuit comprises first superposition circuits each associated with one of the delay members for forming the difference between the input signal of the associated delay member and the output signal of said delay member, a second superposition circuit being provided for forming the sum of the output signals of the first superposition circuits associated with each second delay member of the chain for forming the difference between said sum and the sum of the output signals of the other first superposition circuits and for applying the output signal of the second superposition circuit to the integrator.

In a second embodiment of the invention the combination circuit comprises first superposition circuits succeeded by integrators each being associated with one of the delay members for forming the difference between the input signal of the associated delay member and the output signal of said delay member and for integrating the difference obtained, a second superposition circuit being provided for forming the sum of the output signals of the integrators associated with each second delay member of the chain and for forming the difference between said sum and the sum of the other output signals.

The two embodiments of the invention are distinct in the construction of the combination circuit. After forming the difference in the first superposition circuits, addition takes place first, followed by integration in the first embodiment, whereas this is performed in reverse order in the second embodiment.

If the period of the pulse-shaped input signal comprises only one pulse and one pulse-free interval, the correlator may be constructed in such a manner that the chain consists of two delay members.

The correlator may be used in the field of television signal processing. If the input signal is a (for example, noisy) television signal and if the horizontal pulses occurring in this signal are to be detected, one delay member is suitable for storing just all the sampling of the horizontal pulse of the television signal and the other delay member is suitable for storing just all the sampling values of the pulse-free interval.

In a further embodiment of the invention the chain of delay members is preceded by a non-linear circuit whose transfer factor is dependent on the difference between each sampling value and the sampling value of the pulse top, the difference being smaller in the case of a higher value. Furthermore the chain of delay members is preceded by a limiting circuit. The white parts occurring, for example, in a video signal of a television signal are greatly suppressed and the pulse part is increased by the non-linear circuit and the limiting circuit.

BRIEF DESCRIPTION OF THE DRAWINGS

Embodiments of the invention will now be described in greater detail with reference to the drawings.

DETAILED DESCRIPTION OF THE INVENTION

Figure 1:
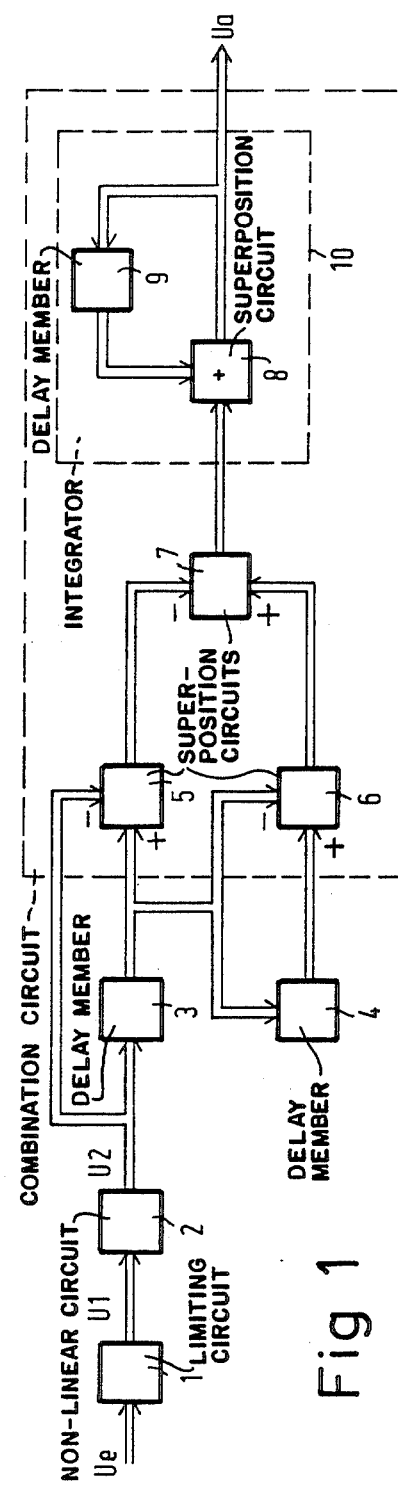
FIG. 1 shows a correlator according to the invention provided with a first embodiment of the combination circuit.
Figure 2:
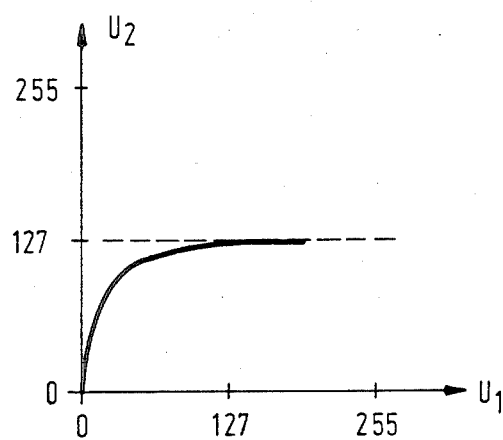
FIG. 2 shows a diagram to explain a non-linear circuit and a limiting circuit shown in FIG. 1, FIG. 3a schematically shows a horizontal pulse with a video signal of a television signal.

In FIG. 1 a pulse-shaped input signal Ue, for example, a television signal present as a series of binary coded sampling values is applied to a limiting circuit 1. If the inupt signal is split up into, for example, 8 bits, the white level of the video signal corresponds to a value of 255 and the pulse top of the horizontal pulse corresponds to a value of zero. The black level of this signal begins at a value of 76. The limiting circuit 1 retains all input signal sampling values of more than 127 at this value. The output signal U1 of the limiting circuit 1 is applied to a non-linear circuit 2. The remaining parts of the video signal are greatly suppressed in a known manner by this non-linear circuit 2 and the distance between the horizontal pulse top and the black value is increased. In FIG. 2 the output signal U2 of the non-linear circuit 2 is shown as a function of the input signal U1.

Figure 3:
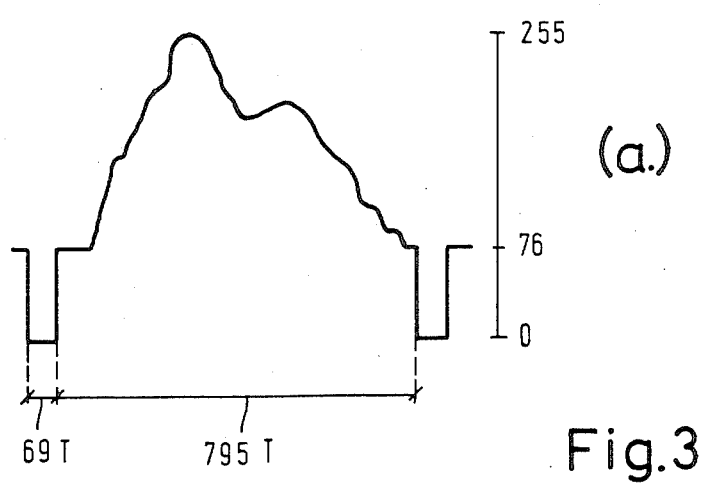
Figure 3:
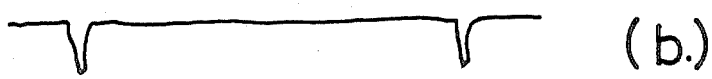

The output signal U2 is applied to a delay member 3 and a combination circuit 11. The output of the delay member 3 is connected to the combination circuit 11 and to a second elay member 4. The output signal of the delay member 4 is applied to the combination circuit 11. The circuit 11 comprises three superposition circuits 5, 6 and 7 and an integrator 10. A delay member may consist of, for example, a shift register circuit or of storage circuits (RAMs) which are arranged as shift registers. If the digital television signal is sampled at a sampling frequency of, for example, 13.5 MHz, the horizontal pulse has 69 sampling values and the pulse-free interval has 795 sampling values. The delay member 3 is constructed in such a manner that it delays 69 clock pulse cycles (69 T) and the delay member 4 delay 795 clock pulse cycles (795 T). FIG. 3a diagrammatically and analogically shows a horizontal pulse and the subsequent pulse-free interval. This input signal may be beset with noise in such a manner that the instant of occurrence of the horizontal pulse is no longer detected.

The output signal U2 of the non-linear circuit 2 is subtracted from the output signal of the delay member 3 in the superposition circuit 5 and the output signal of the delay member 3 is subtracted from the output signal of the delay member 4 in the superposition circuit 6. In the superposition circuit 7 the output signal of the superposition circuit 5 is subtracted from the output signal of the superposition circuit 6. The output of the superposition circuit 7 is connected to the integrator 10 comprising a superposition circuit 8 and a delay member 9 delaying each signal by one clock pulse. The input signal of the integrator 10 is simultaneously the input signal of the superposition circuit 8. The output signal of the superposition circuit 8 is applied to the delay member 9. The output signal of the delay member 9 constitutes a second input signal of the superposition circuit 8. The two input signals are added in the superposition circuit 9 and the result of this addition is the output signal Ua of the correlator.

In order that the horizontal pulse can be detected out of noise, the television signal is to be correlated with an appropriate specimen signal. Since the sampling value of the horizontal pulse of an undisturbed television signal is more negative than the remaining signal, the specimen horizontal pulse was fixed at $+1$ and the remaining specimen signal was fixed at $-1$. The number of sampling values between the leading edges of two horizontal pulses is 864 sampling values at the sampling frequency of 13.5 MHz. The horizontal pulse then consists of 69 sampling values (of the period T) and the pulse-free interval consists of 795 sampling values (of the period T) as is shown in FIG. 3a. This means that the correlation function is formed from the sum of 69 sampling values with a positive sign and 795 sampling values with a negative sign. If all sampling values of a horizontal pulse are stored in the delay member 3 and all sampling values of the pulse-free interval are stored in delay member 4., the output signal Ua assumes a minimum value (extreme value) (FIG. 3b).

The above-mentioned realizaton of the specimen function by fixing the sign is realized by the superposition circuit 7. Addition and storage of 69 and 795 sampling values is realised by the difference formation in the superposition circuits 5 and 6 and the integrator 10. As is shown in FIG. 3b the output signal Ua assumes an extreme value for a pulse. In this embodiment the extreme value is at a minimum because the output signal of the superposition circuit 5 is subtracted from the output signal of the superposition circuit 6 in the superposition circuit 7. The circuit can be modified in such a manner that the output signal Ua assumes a maximum value when a pulse occurs. To this end the output signal of the superposition circuit 6 is to be subtracted from the output signal of the superposition circuit 5 in the superposition circuit 7.

The limiting circuit 1 and the non-linear circuit 2 are not necessarily required for the correlator to function. A practical circuit construction has proved that this combinatin of limiting circuit 1 and non-linear circuit 2 improves the detection of noisy horizontal pulses of a television signal.

Figure 4:
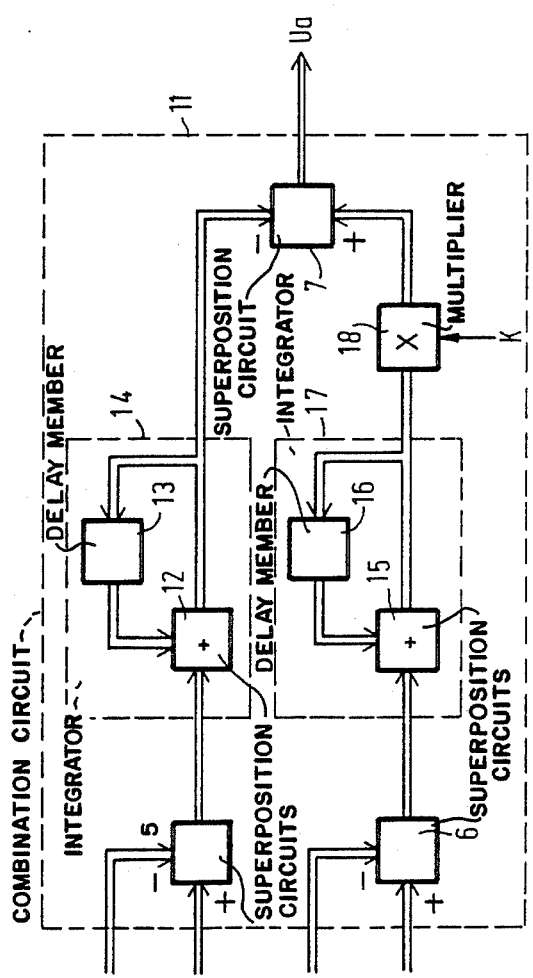
FIG. 3b shows a possible correlator output signal and FIG. 4 shows a second embodiment of the combination circuit.

FIG. 4 shows a second embodiment of the combination circuit 11. The circuit elements having the same function as in FIG. 1 have the same reference numerals. As in FIG. 1 the superposition circuit 5 forms the difference between the input signal and the output signal of the delay member 3 and the superposition circuit 6 forms the difference between the input signal and the output signal of the delay member 4. The output signal of the superposition circuit 5 is applied to an integrator 14 consisting of a superposition circuit 12 and a delay member 13 and being constructed similarly as the integrator 10 described with reference to FIG. 1. The output of the superposition circuit 6 is also connected to an integrator 17 which also comprises a superposition circuit 15 and a delay member 16. The output signal of the integrator 17 constructed in a similar manner as integrator 10 is applied via a multiplier 18 to the superposition circuit 7, and the output signal of the integrator 14 is applied to the superposition circuit 7. As described in FIG. 1 the difference between these two signals is formed in the superposition circuit 7. The output signal of this superposition circuit 7 is the output signal of the correlator.

Unlike the first embodiment of the combination circuit, the integration succeeded by superposition in FIG. 4 is performed after the two superposition circuits 5 and 6. Since the word length of the output signal of the integrator 17 is very much longer than the word length of the output signal of the integrator 14, the output signal of the integrator 17 is multiplied by the multiplier 18 by a constant factor of K (for example, 69/795) thus reducing the word length and hence the hard-ware complexity. The multiplier may consist of, for example, two shift circuits and one superposition circuit. The binary output signal of the integrator 17 is shifted in a shift circuit by 4 positions in the direction of the lower values and in a shift circuit arranged in parallel therewith by 5 positions, and the output signals of the two shift circuits are subsequently added. The ratio of 69/795 is approximated in this multiplier arrangement by $1/16+1/32=1/10.7$.

The above described embodiments are limited to the detection of the horizontal pulse in a noisy television signal. The circuit may, however, be extended in such a manner that the composite synchronisation pulse can also be detected during a field change. To this end further delay members must be added and the difference between the input and the output signal of the delay members must be formed and the results must be superposed. The output signal of the last delay member then is the input signal of the next delay member. The separate delay periods correspond to the sampling values of the pulses and of the pulse-free intervals, respectively.

We claim:

1. A correlator comprising a cascaded chain of a first delay member and at least a second delay member, the first of which receives an input signal comprising pulses in periodical intervals and being present as a series of digital sampling values, and a combination circuit for linearly combining the input signal of the first delay member and the output signals of all delay members and for generating by the occurrence of a pulse a correlator output signal assuming an extreme value, characterized in that a pulse and a pulse-free interval, respectively are associated with each delay member, in that the delay members succeed each other in the same manner as the pulses and pulse-free intervals occur, in that all but at most one delay member at the beginning or end of the chain are suitable for storing just all sampling values of the associated pulse of pulse-free interval, and in that the combination circuit additionally comprises an integrator for integrating the linearly combined signal.

2. A correlator as claimed in claim 1, characterized in that the combination circuit comprises first superposition circuits each associated with one of the delay members for forming a difference between the input signal of the associated delay member and the output signal of said associated delay member, a second superposition circuit being provided for forming a first sum representing the sum of the output signals of the first superposition circuits associated with each second delay member of the chain and for forming a difference between said first sum and a second sum representing the sum of the output signals of the first superposition circuit associated with said first delay member, and for applying the output signal of the second superposition circuit to the integrator.

3. A correlator as claimed in claim 1, characterized in that the combination circuit comprises first superposition circuits succeeded by integrators, each being associated with one of the delay members for forming a difference between the input signal of its associated delay member and the output signal of said associated delay member and for integrating the difference obtained, a second superposition circuit being provided for forming a first sum representing the sum of the output signals of the integrators associated with each second delay member of the chain and for forming the difference between said first sum and a second sum representing the sum of the output signals of the first superposition circuit associated with said first delay member.

4. A correlator as claimed in claim 2, characterized in that a multiplier is arranged between at least one of the first superposition circuits and the second superposition circuit.

5. A correlator as claimed in claim 1, characterized in that the chain consists of two delay members.

6. A correlator as claimed in claim 1, characterized in that the input signal is a television signal and that one delay member is suitable for storing just all the sampling values of the horizontal pulse of the television signal and the other delay member is suitable for storing just all the sampling values of the pulse-free interval.

7. A correlator as claimed in claim 1, characterized in that the chain of delay members is preceded by a non-linear circuit whose transfer factor is dependent on a difference between each sampling value of the input signal and the sampling value of the pulse top, the difference being smaller in the case of a higher sampling value of the pulse top.

8. A correlator as claimed in any one of the preceding claims, characterized in that the chain of delay members is preceded by a limiting circuit.

9. A correlator as claimed in claim 3, characterized in that a multiplier is arranged between at least one of the first superposition circuits and the second superposition circuit.

10. A correlator as claimed in claim 2, characterized in that the chain consists of two delay members.

11. A correlator as claimed in claim 3, characterized in that the chain consists of two delay members.

12. A correlator as claimed in claim 4, characterized in that the chain consists of two delay members.

13. A correlator as claimed in claim 9, characterized in that the chain consists of two delay members.

14. A correlator as claimed in claim 2, characterized in that the input signal is a television signal and that one delay member is suitable for storing just all the sampling values of the horizontal pulse of the television signal and the other delay member is suitable for storing just all the sampling values of the pulse-free interval.

15. A correlator as claimed in claim 3, characterized in that the input signal is a television signal and that one delay member is suitable for storing just all the sampling values of the horizontal pulse of the television signal and the other delay member is suitable for storing just all the sampling values of the pulse-free interval.

16. A correlator as claimed in claim 4, characterized in that the input signal is a television signal and that one delay member is suitable for storing just all the sampling values of the horizontal pulse of the television signal and the other delay member is suitable for storing just all the sampling values of the pulse-free interval.

17. A correlator as claimed in claim 9, characterized in that the input signal is a television signal and that one delay member is suitable for storing just all the sampling values of the horizontal pulse of the television signal and the other delay member is suitable for storing just all the sampling values of the pulse-free interval.

18. A correlator as claimed in claim 5, characterized in that the input signal is a television signal and that one delay member is suitable for storing just all the sampling values of the horizontal pulse of the television signal and the other delay member is suitable for storing just all the sampling values of the pulse-free interval.

19. A correlator as claimed in claim 11, characterized in that the input signal is a television signal and that one delay member is suitable for storing just all the sampling values of the horizontal pulse of the television signal and the other delay member is suitable for storing just all the sampling values of the pulse-free interval.

20. A correlator as claimed in claim 12, characterized in that the input signal is a television signal and that one delay member is suitable for storing just all the sampling values of the horizontal pulse of the television signal and the other delay member is suitable for storing just all the sampling values of the pulse-free interval.

* * * * *

UNITED STATES PATENT AND TRADEMARK OFFICE
CERTIFICATE OF CORRECTION

PATENT NO. : 4,743,969

DATED : May 10, 1988

INVENTOR(S) : Alwin F.G. Habeck et al

It is certified that error appears in the above-identified patent and that said Letters Patent is hereby corrected as shown below:

IN THE CLAIMS

Claim 1, line 16   change "of" to --or--

Signed and Sealed this

Twenty-first Day of March, 1989

Attest:

DONALD J. QUIGG

*Attesting Officer*   *Commissioner of Patents and Trademarks*